3,219,529
STABLE TETRACYCLINE SOLUTIONS
Robert Arnold Nash, Spring Valley, and Bruce Edwin Haeger, Pomona, N.Y., assignors to American Cyanamid Company, Stamford, Conn., a corporation of Maine
No Drawing. Filed Oct. 4, 1962, Ser. No. 228,261
5 Claims. (Cl. 167—65)

This invention relates to stable antibiotic solutions of the tetracycline group. As used in the specification and claims the term "antibiotic solution" means a solution containing substantial amounts of antibiotic. Compositions containing small traces of antibiotic are not included.

In the past there has been a demand for solutions of tetracycline antibiotics which would be stable and which could be used for topical or other therapeutic uses. For the most part the solutions have been prepared by forming metal complexes with the tetracyclines. Stability has been achieved but in a number of cases the presence of metal ion complexes are not always desirable, and while they have been practically useful, there is still a need for stable, relatively non-toxic solutions of neutral tetracycline antibiotics. It is with the solution of this problem and with stable solutions that the present invention deals. It should be understood that in the present invention we are concerned with so called neutral tetracyclines, that is to say the amphoteric tetracyclines themselves, and not their salts with various acids or bases.

The requirements for satisfactory tetracycline antibiotic solutions requires stability on storage at room temperatures, lack of toxicity and retention of the antibiotic activity. Reasonable compatibility with water is also a desirable characteristic as sometimes the solutions are utilized in aqueous media. It is an advantage that the preferred compositions of the present invention are so usable.

Essentially the solutions of the present invention involve three classes of compounds. The first are esters of lower polyhydric alcohols with lower alkyl fatty acids. These esters should in general have no free hydroxyl groups. Among the best are the glycerol esters, such as triacetin. The corresponding triester of propionic acid can, of course, also be used, but as it shows no advantages over triacetin and is more expensive triacetin is the preferred member of the ester group.

The second class of compounds is represented by the certain oxygen heterocycles namely, dioxane, terthydrofuran, and particularly lower alkyl ethers of isosorbide. Other oxygen heterocycles such as 1,3-dioxolane are not useful.

The third class is amides of higher molecular weight aliphatic fatty acids disubstituted by lower alkyl groups. In general the fatty acids from 8 to 14 carbon atoms give the best results. These are often mixtures and it does not appear to be of any particular significance whether the aliphatic fatty acid portion of the molecule is a pure radical. For example, ordinary substituted commercial lauramides give good results. Solutions which are prepared from the lower alkyl ethers of isosorbide constitute the preferred compositions of the present invention.

The invention will be described in greater detail in conjunction with the following specific examples. In each case the solution is prepared with thorough stirring. It should be noted that the tetracycline antibiotic weights are in the neutral form, rather than the customary basis as the hydrochlorides. The pH values in the samples were measured potentiometrically using glass and saturated calomel electrodes.

EXAMPLE 1

2.37 grams of neutral tetracycline are dissolved in 50 ml. of dimethyl isosorbide. The pH of the bulk solution is 6.3 and on a 1 to 1 dilution in water decreases to 5.6.

EXAMPLE 2

The same proportions of tetracycline as in Example 1 are used but the solvent is diethyl isosorbide. The pH of the bulk solution is 5.7 and on dilution in water 1:1 5.5.

EXAMPLE 3

The proportions of Example 1 are repeated, replacing the dimethyl isosorbide with the same volume of triacetin. The solution shows a bulk pH of 6.3 which decreases to 5.1 on 1:1 dilution in water. In time very small amounts of tetracycline precipitate, but not sufficient to significantly affect the composition. The solubilities of chlortetracycline, oxytetracycline, demethyl tetracycline and demethyl chlortetracycline are not quite as high. However, concentrations in the 10–40 mg./ml. range are obtainable, typical examples being shown in the following two examples.

EXAMPLE 4

2.34 grams of demethyltetracycline are dissolved in 100 ml. of triacetin. The solution shows a bulk pH of 6.6 which decreases to 4.8 on 1:1 dilution with water.

EXAMPLE 5

5.57 grams of chlortetracycline are dissolved in 100 ml. of triacetin producing a stable solution.

EXAMPLE 6

11.13 grams of chlortetracycline are dissolved in 100 ml. of dimethyl isosorbide, a stable solution being obtained. It will be noted on comparison with Example 5 that the solubility of chlortetracycline is markedly greater in the isosorbide ether than in triacetin. However, the concentrations obtainable in triacetin shown in Example 5 are entirely adequate.

EXAMPLE 7

2.4 grams of tetracycline are dissolved in 50 ml. of an equal mixture of dimethyl isosorbide and diethyl isosorbide. Bulk pH of the solution is 5.3 and decreases to 4.8 on dilution 1:1 with water.

EXAMPLE 8

2.5 grams of tetracycline are dissolved in 50 ml. of dioxane. A stable solution is obtained.

EXAMPLE 9

The procedure of Example 8 is repeated but the dioxane is replaced by tetrahydrofuran. The solution obtained is stable.

EXAMPLE 10

The procedure of Example 8 is repeated, replacing the dioxane with an equal amount of dimethyllauramide. A stable solution results.

EXAMPLE 11

Example 3 is repeated, replacing the 50 ml. of triacetin with the same amount of the triester of glycerol and propionic acid. A stable solution results but exhibits the same characteristics as with triacetin, namely there is a slight precipitation on prolonged storage.

EXAMPLE 12

Example 3 is repeated, replacing the triacetin with an equal amount of ethyleneglycol diacetate. A stable solution results.

EXAMPLE 13

The procedure of Example 12 is repeated, replacing the ethyleneglycol acetate with the corresponding dipropionate. A stable solution results.

EXAMPLE 14

The procedure of Example 12 is repeated, replacing the ethylene glycol diacetate with an equal amount of butylene glycol diacetate. A stable solution results.

The stability of the solutions of the present invention were tested against other typical organic solvents in two ways. First, by an accelerated test, autoclaving at 121° C., and secondly, at a lower temperature for a longer period of storage. In every case the antibiotic was tetracycline and the concentration 50 mg./ml. Table I shows the stability after autoclaving.

*Table I*

AUTOCLAVE STABILITY OF NEUTRAL TETRACYCLINE (50 MG./ML. AS TC.HCl) IN VARIOUS SOLVENTS AT 121° C.

| Solvent | Microbiological activity (percent of theory) | | |
|---|---|---|---|
| | 30 min. | 60 min. | 120 min. |
| Diethyl isosorbide | 92 | 94 | 91 |
| Diethyl nicotinamide | 66 | 51 | 27 |
| Dimethyl acetamide | 43 | 28 | 20 |
| Dimethyl isosorbide | 85 | 78 | 75 |
| Dimethyl lactamide | 16 | 17 | 17 |
| Dimethyl lauramide | 82 | 81 | 70 |
| Dioxane | 87 | 86 | 82 |
| 1,3-dioxolane | 46 | 39 | 32 |
| Ethanol (abs.) | 36 | 12 | 2 |
| Isopropylidene glycol | 67 | 58 | 42 |
| Monacetin | 10 | <10 | <10 |
| Polyethylene glycol 400 | 58 | 37 | <5 |
| Propylene glycol | <5 | <5 | <5 |
| Tetrahydrofuran | 82 | 77 | 66 |
| Triacetin | 83 | 82 | 76 |

It will be noted that even at two hours autoclaving the solutions of the present invention retained at least two-thirds of their antibiotic activity, where as the best that any other solvent did, isopropylidene glycol was less than half. It should also be noted that the presence of a hydroxy group as shown by monoacetin completely destroys stability.

EXAMPLE 15

Tests were made at room temperature and 42° C. for extended periods of time. The results of these tests are shown in Table II. As in the case of the preceding tests, the solution was of tetracycline in a concentration of 50 mg./ml.

*Table II*

STABILITY OF NEUTRAL TETRACYCLINE (50 MG./ML. AS TC.HCl) IN VARIOUS SOLVENTS AT LOW TEMPERATURES

| Solvent | Initial | Microbiological activity (percent of theory) | | | | |
|---|---|---|---|---|---|---|
| | | 42° C., 2 mon. | Room temperature | | | |
| | | | 2 mon. | 4 mon. | 6 mon. | 1 yr. |
| Diethyl isosorbide | 95 | 84 | 92 | 88 | 77 | 93 |
| Diethyl nicotinamide | 82 | 26 | 74 | ≤16 | | |
| Dimethyl isosorbide | 91 | 78 | 82 | 88 | 86 | 79 |
| Dimethyl lauramide | 94 | 84 | 92 | 86 | 88 | 85 |
| Dioxane | 96 | 77 | 87 | 83 | 76 | 85 |
| Isopropylidene glycol | 71 | 32 | 66 | | | 46 |
| Tetrahydrofuran | 98 | 81 | 85 | 82 | 89 | 88 |
| Triacetin | 94 | 82 | 91 | 87 | 85 | 79 |

It will be noted that even at a shorter total length of time diethyl nicotinamide and isopropylidene glycol showed marked losses of activity as compared to the solutions of the present invention. Another advantage of the particular oxygen heterocyclic solvents is that an antioxidant is not required to maintain color stability when the solutions are made up in ampules and stored. This is a rather surprising result as it is normal to add antioxidants to solutions of tetracycline antibiotics for color stabilization.

EXAMPLE 16

Tests were also made using other neutral tetracycline antibiotics in the solvents of the present invention. The results of this stability at room temperature for extended periods of storage are shown in Table III.

*Table III*

STABLE SOLUTIONS OF OTHER NEUTRAL TETRACYCLINE ANTIBIOTICS AT THERAPEUTIC LEVELS

| System | Concen., mg./ml. | Microbiological activity (percent of theory), room temperature | |
|---|---|---|---|
| | | 2 mon. | 1 year |
| CTC/triacetin | 25 | 98 | 86 |
| OTC/triacetin | 10 | 98 | |
| DMCTC/triacetin | 10 | 101 | 90 |
| DMTC/triacetin | 25 | 98 | |
| CTC/dimethyl lauramide | 50 | 88 | 89 |
| OTC/dimethyl lauramide | 50 | 106 | |
| DMCTC/dimethyl lauramide | 50 | 98 | 92 |
| DMTC/dimethyl lauramide | 50 | 101 | |
| OTC/dimethyl isosorbide | 50 | 81 | 84 |
| DMCTC/dimethyl isosorbide | 50 | 72 | |
| CTC/dioxane | 50 | 84 | 87 |
| OTC/dioxane | 50 | 98 | |
| DMCTC/dioxane | 50 | 86 | 87 |
| DMTC/dioxane | 50 | 99 | |

CTC—Chlortetracycline. OTC—Oxytetracycline. DMCTC—Demethylchlortetracycline. DMTC—Demethyltetracycline.

Table III shows that many other neutral tetracycline antibiotics also retain their potency and physical stability in the solvents of the present invention.

The stability of the compositions of the present invention is markedly decreased by the presence of such materials as water, bases, for example, triethanolamine, acids such as ascorbic acid, lactic acid, acetic acid, sulfuric acid, etc. Also certain solid adjuvants such as nicotinamide, isosorbide itself, caprolactam, should not be present. It should be noted that while the presence of water decreases the stability on long standing this does not mean that the products of the present invention may not be used when diluted with water. In fact this is often done but once diluted they will not retain their long-term stability. In addition to the excellent physical and chemical stability of the solutions in isosorbide ethers, triacetin and the like, the ready dilution with water exhibited by these products is an advantage for many uses. Dimethyl lauramide produces quite stable solutions, as is shown in the preceding tables, but it has rather poor water solubility, and so is less desirable where dilution with water is necessary for administration.

We claim:
1. Stable solutions of neutral tetracycline antibiotics in lower alkyl ethers of isosorbide.
2. Solutions according to claim 1 in which the tetracycline antibiotic is tetracycline.
3. Solutions according to claim 1 in which the antibiotic is oxytetracycline.
4. Solutions according to claim 1 in which the antibiotic is demethyltetracycline.
5. Solutions according to claim 1 in which the antibiotic is demethylchlortetracycline.

No references cited.

LEWIS GOTTS, *Primary Examiner.*